United States Patent [19]

Sheldon

[11] Patent Number: 5,504,321
[45] Date of Patent: Apr. 2, 1996

[54] TICKETLESS TRAVEL CARD AND METHOD OF USE

[76] Inventor: Dunstan P. Sheldon, 1752 Altadena Dr., Altadena, Calif. 91001

[21] Appl. No.: 300,945

[22] Filed: Sep. 6, 1994

[51] Int. Cl.[6] ............................ G06K 19/06; G07B 15/02
[52] U.S. Cl. ........................................ 235/492; 235/324
[58] Field of Search ................................. 235/384, 382, 235/375, 492, 380

[56] References Cited

U.S. PATENT DOCUMENTS

| | | | |
|---|---|---|---|
| 4,954,985 | 9/1990 | Yamazaki | 235/482 X |
| 5,051,565 | 9/1991 | Wolfram | 235/384 |
| 5,168,150 | 12/1992 | Plouzennec et al. | 235/384 X |
| 5,189,287 | 2/1993 | Parienti | 235/375 |
| 5,229,586 | 7/1993 | Ishii | 235/375 |

FOREIGN PATENT DOCUMENTS

| | | | |
|---|---|---|---|
| 0257396 | 2/1990 | Japan | 235/380 |
| 5334501 | 12/1993 | Japan | 235/384 |

*Primary Examiner*—John Shepperd
*Assistant Examiner*—Thien Minh Le
*Attorney, Agent, or Firm*—William W. Haefliger

[57] ABSTRACT

In a ticketless travel card package, the combination comprising a generally rectangular base card having opposite first and second sides to carry and present identification indicia at the first side; a programmable read/write memory circuit carried in a local section of the card to store encoded travel data A: and a thermally printable flat sheet laminated onto the second side of the card to carry and visually present data B which is a sub-set of data A.

7 Claims, 6 Drawing Sheets

Fig. 6.

```
JULY 26 UA FLT 156 1:10P
    LAX-ORD - 3A
    AVIS CF#123456789
    HILTON #123456789
JULY 28 AA FLT 115 5:00P
    ORD-DFW-12B
    HERTZ #123456789
    HYATT #154321987
JULY 29 DL FLT 65 6:00P
    DFW-ATL-10A
    MARRIOTT#128965432
JULY 30 US FLT 82 4:00P
    ATL-DIT-5B
    SHERATON #5671234
JULY 31 US FLT 15 4:30P
    DIT-LAX -2A
```

Fig. 7.

```
BANK OF THE WORLD
FREQUENT TRAVEL CARD
A024 0046 8790 8405
VALID FROM  GOOD THRU
  09/92        08/95
DUNSTAN P. SHELDON
```
12

Fig. 4.

```
JULY 26 UA FLT 1156 1:10P
    LAX-ORD - 3A
    AVIS CF#123456789
    HILTON #123456789
JULY 28 AA FLT 115 5:00P
    ORD-DFW-12B
    HERTZ #123456789
    HYATT #154321987
JULY 29 DL FLT 65 6:00P
    DFW-ATL-10A
    MARRIOTT#12896543
JULY 30 US FLT 82 4:00P
    ALT-DET-5B
    SHEARTON#5671234
JULY 31 US FLT 15 4:30P

DIT-LAX-2A
```
14a, 13

Fig. 5.

```
AUTHORIZED SIGNATURE
JULY 26 LAX
    UA-733 4:30P
    AVIS#12345678
    HILTON #125697I
JULY 28 ORD DFW
    AA 115  5:00P
    SEAT 12B

AVIS 35678910
    HYATT 12379457

JULY 30 DFW AT
    DL 65 6:00 P
    SEAT 10A
```
14, 15, 13

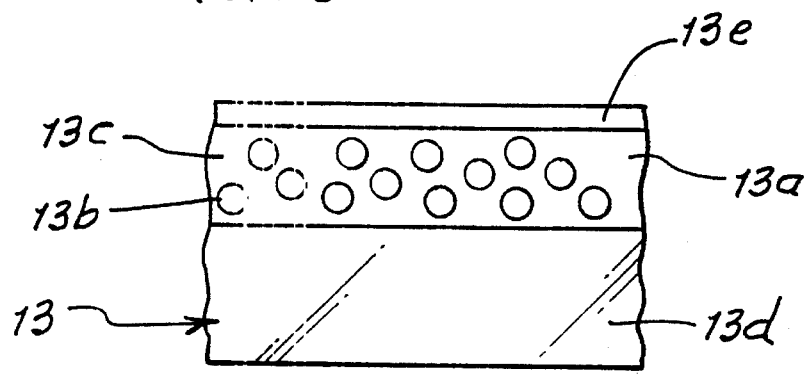
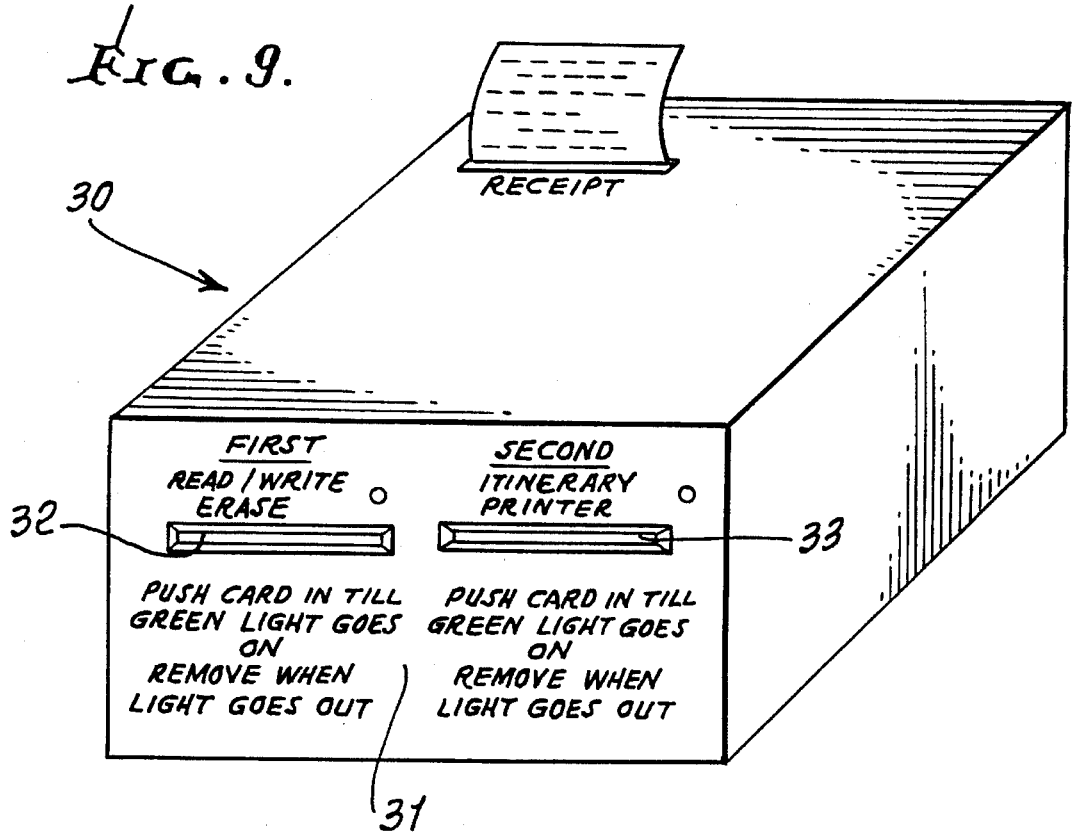

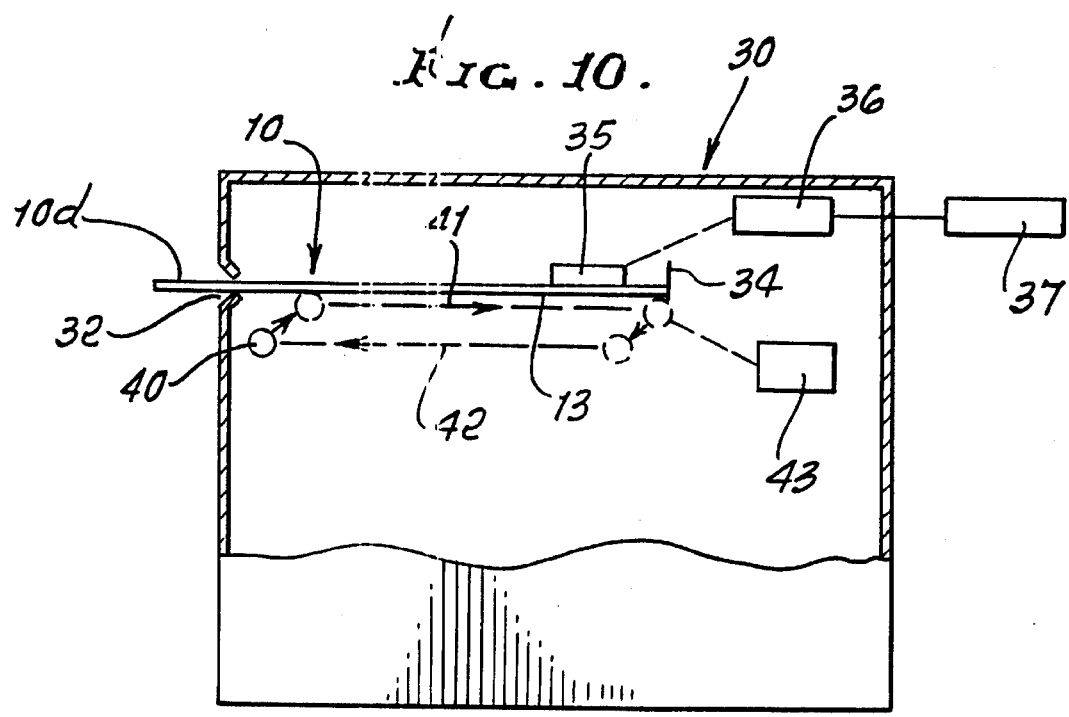
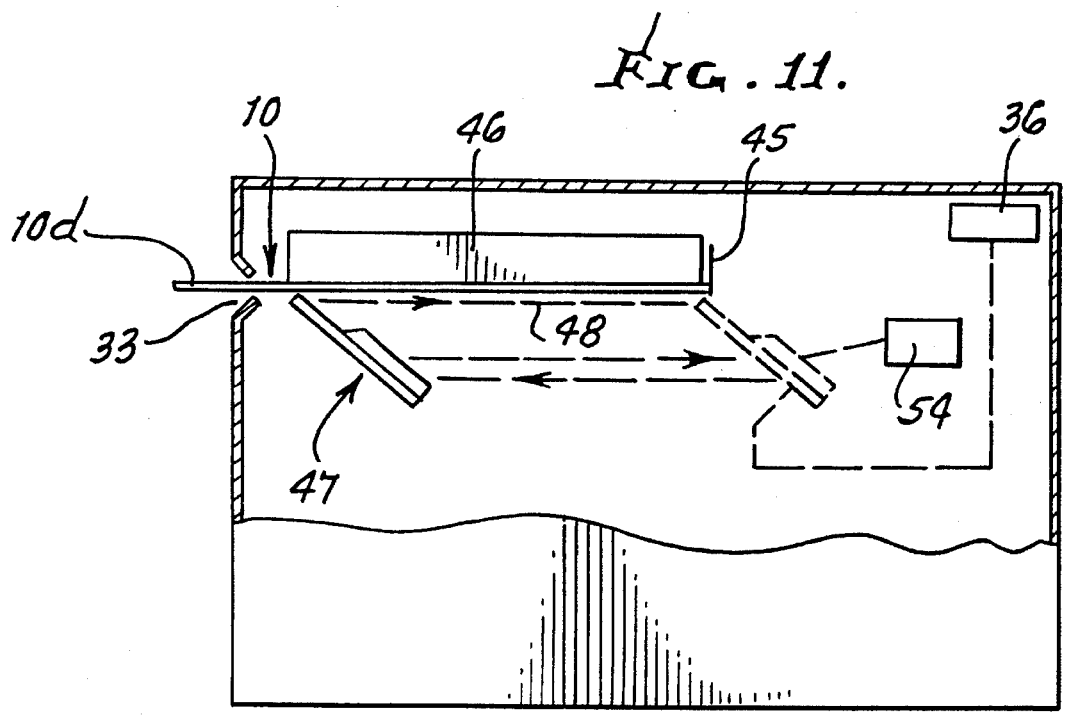

TICKETLESS TRAVEL CARD AND METHOD OF USE

BACKGROUND OF THE INVENTION

This invention relates generally to travel documentation, and more particularly to provision of a "ticketless" travel card package that stores encoded travel data as well as visible travel data, all such data being changeable as for each travel trip or itinerary.

In the past, it was proposed to provide "memory" cards or "smart" cards which have chips for memory, and sometimes microprocessors, embedded in the plastic cards, as a means for replacing the normal airline ticket or other transportation ticketing. However, such proposed cards required the user to have another document on which his or her travel itinerary was printed, so that the traveler's flight number, seat number, airline, time and date of flight etc. was readily available on that separate document.

There is need for a way to provide all travel trip information and data on one card to enable "ticketless" travel, and to enable change of all such information.

SUMMARY OF THE INVENTION

It is a major object of the invention to provide simple, convenient means to meet the above need, so that "ticketless" travel is indeed achieved. Basically, the invention is embodied in a travel card package comprising:

a) a generally rectangular base card having opposite first and second sides to carry and present identification indicia at said first side, b) a programmable read/write memory circuit carried in a local section of the card to store encoded travel data A, c) and a thermally printable flat sheet laminated onto the second side of the card to carry and visually present data B which is a sub-set of data A.

It is another object to provide the data B as referenced to in the form of thermally erasable alpha numeric indicia indicative of a travel itinerary, said indicia locally thermally printed on the flat sheet. As will be seen the flat sheet may comprise thermo plastic material; and the flat sheet may have a recording layer sandwiched between a polyester film base and an overcoat layer. As will appear, the flat sheet may take the form of a Ricoh TC erasable thermal film. That form or sheet typically substantially completely covers the second side of the card to provide a composite package of uniform thickness.

A further object is to provide a magnetic strip or stripe on said one side of the card for magnetically storing data C. The base card itself may consist of PVC resin.

Another aspect of the invention concerns the provision of first means to receive the above described card and to encode data A in the card memory circuit; together with second means to thermally print data B on the flat sheet. See for example the thermal printing means and process disclosed in U.S. Pat. No. 4,695,528. Means to erase the thermally printed data may be incorporated with the first or second means, as will appear. A console at an airport may carry such described means, and form an associated opening openings to receive major extent of the card, for processing. The card remains manually retrievable, at all times.

These and other objects and advantages of the invention, as well as the details of an illustrative embodiment, will be more fully understood from the following specification and drawings, in which:

DRAWING DESCRIPTION

FIGS. 4, 5 and 6 are back side views, respectively, of modified cards;

FIGS. 7 is front side view of the modified cards;

FIG. 8 is an enlarged section taken through a flat sheet of erasable thermal film usable for laminating on a base card, to form the package;

FIG. 9 is a perspective view of apparatus for reading, writing and printing on a package as described, in two steps;

FIG. 10 is a section taken through FIG. 9 to show a read/write and erase module;

FIG. 11 is a section taken through FIG. 9 to show a card print module;

DETAILED DESCRIPTION

Figure 1:
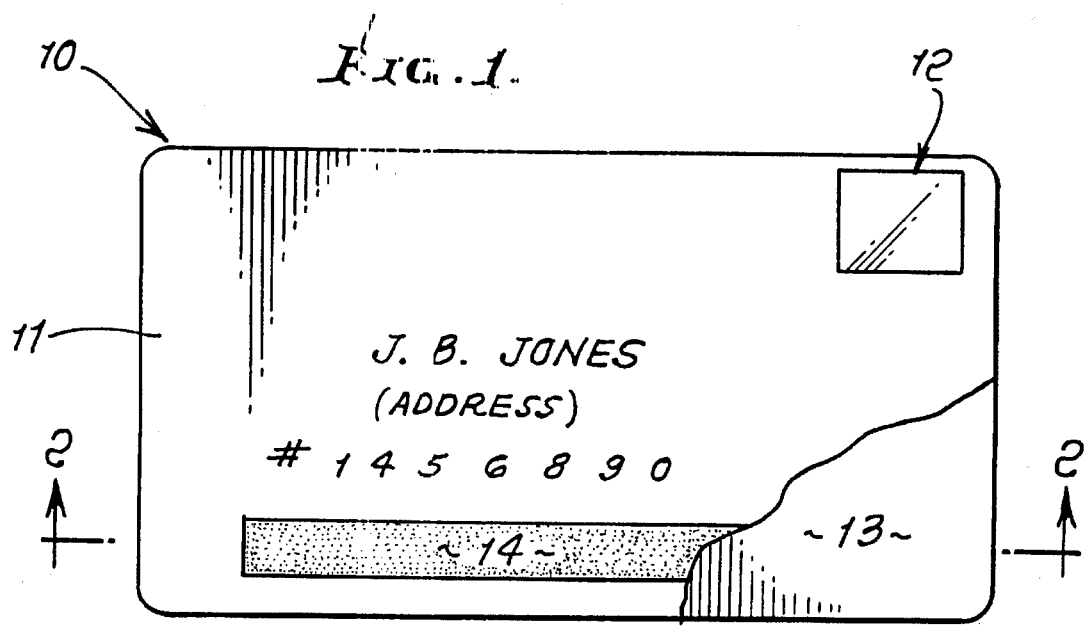
FIG. 1 is a plan view of a travel card package incorporating the invention.
Figure 2:
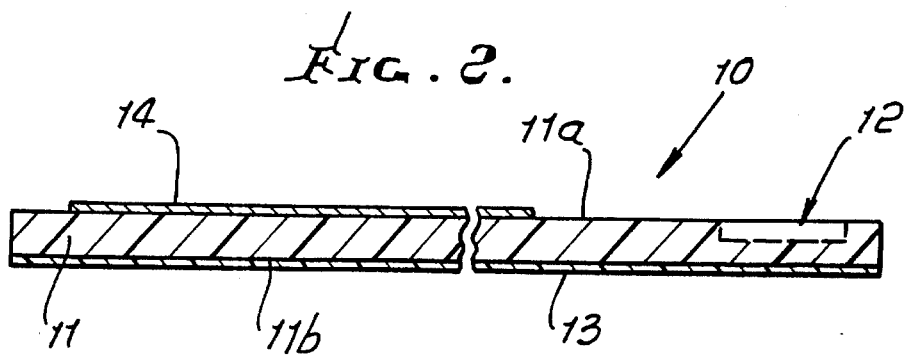
FIG. 2 is a section taken on lines 2—2 of FIG. 1.

In FIG. 1, package 10 includes a generally rectangular base card 11 which may for example consist of plastic material such as PVC. Contained or located at a corner of the card is a programmable read/write memory circuit 12, to store encoded travel data A, which may include alphanumeric data as is commonly printed on an airline travel ticket (flight, time, customer, etc.). Such a card may take the form of that described in U.S. Pat. Nos. 4,605,844, 4,697,073, and 4,731,645, for example.

Circuit 12 is exposed at side 11a of the card. Laminated or otherwise attached to the opposite side 11b of the card 11 is a thin, thermally printable flat sheet 13, to carry and visually present thermally printed data B, which may be regarded as a sub-set of data A. Data B is typically in the form of thermally printable and erasable alphanumeric indicia indicative of a card user's travel itinerary. See FIGS. 4, 5 and 6. Sheet 13 typically comprises thermoplastic material, and may take the form of known Ricoh TC Erasable Thermal Film, shown in FIG. 8. Note in that view the recording layer 13a containing organic low molecular weight particulate material 13b embedded in resin 13c. Layer 13a is sandwiched between a transparent polyester film 13d and an overcoat layer 13e. The latter is laminated to the card side 11b, and the viewer looks into transparent film 13d to view the printed data thermally recorded in recording layer 13a.

Figure 3:
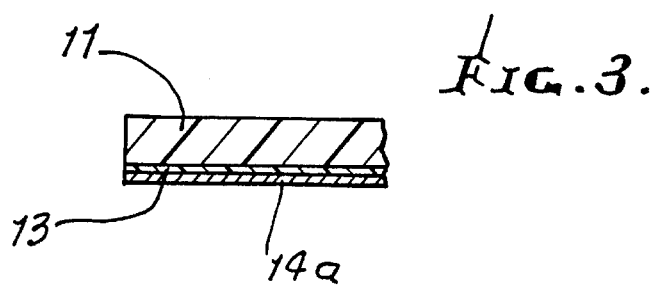
FIG. 3 is a fragmentary section showing a modification.

Sheet 13 substantially completely covers side 11b of the card 11, to provide the package. FIG. 1 shows a magnetic stripe or strip 14 applied to side 11a of the card, to magnetically store data C, as in a credit card, whereby the package stores data A, B and C. Strip 14 may alternatively be applied to and carried by the flat sheet 13, as at 14a in FIG. 3. A signature panel or strip 15 may be carried by the sheet 13, as on it's back side seen in FIG. 5. FIGS. 4 and 5 show a card with magnetic stripes 14 and 14a on rear sides of cards, the stripes carried by the flat sheet 13.

FIG. 9 illustrates a cabinet 30 having a front side 31 defining card entry slots 32 and 33. The card as described, when inserted into slot 32, engages a stop 34 seen in FIG. 10, leaving a small portion 10d of the card package projecting from the cabinet for manual retrieval at all times. When so inserted, the circuit 12 is encoded by a read/write head 35 to which data A is transmitted from a terminal micro process and memory circuit 36 in the cabinet which is interfaced to a host system, 37. FIG. 10 also shows a thermal erase head 40 which travels along a path 41 adjacent the sheet 13 to thermally erase indicia encoded in the latter. The head then returns to its initial position, via path 42. A drive to move the head as described, is indicated at 43. The head may be heated to between 70 and 90 degrees Centigrade, to effect erasing.

FIG. 11 shows the card package 10 inserted into slot 33, to engage stop 45, leaving card portion 10d exposed for manual retrieval. A support platen appears at 46. A thermal print head 47 travels along path 48 adjacent sheet 13, to thermally print indicia corresponding to data B, transmitted to that head from circuit 36. Data B may or may not be a sub-set of data A. The head 47 returns to start position via the same path, and it operates to print indicia at a temperature between 110° C. and 130° C. A drive for the head is shown at 54. Printing may be accomplished via tiny heated dot-loci on the head, at density between 200 and 300 per inch, as is known.

Figure 14:
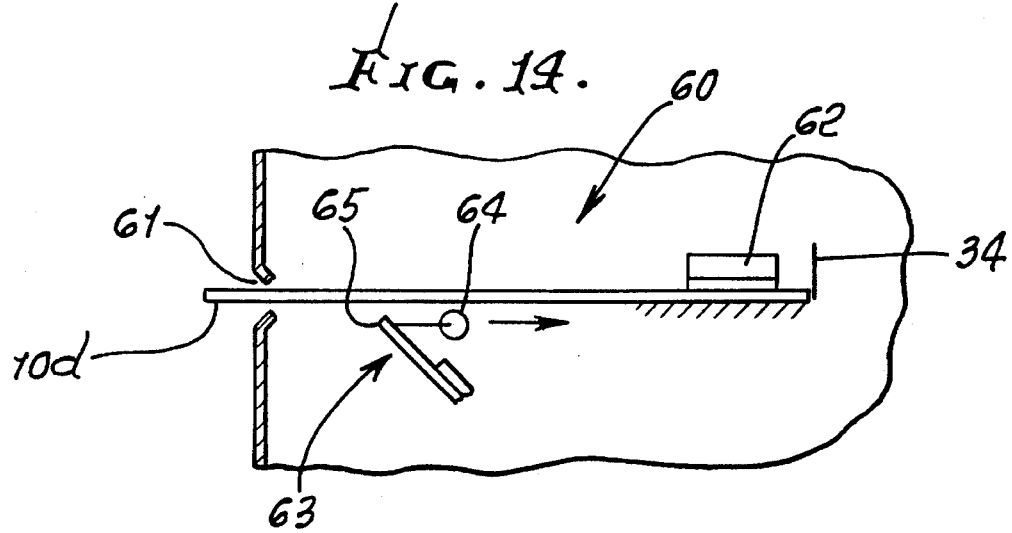
FIG. 14 is a perspective view of modified apparatus for reading, writing and printing on a package, as described.

FIG. 14 shows alternative apparatus 60 for receiving the card in one slot 61, and to perform the encoding function at 62, and the erasing and printing functions at 63 with the card in the position shown. The erase head 64 travels ahead of and with the thermal print head 65, to erase old indicia and print new indicia, in one operation, or two separate operations.

Figure 12:
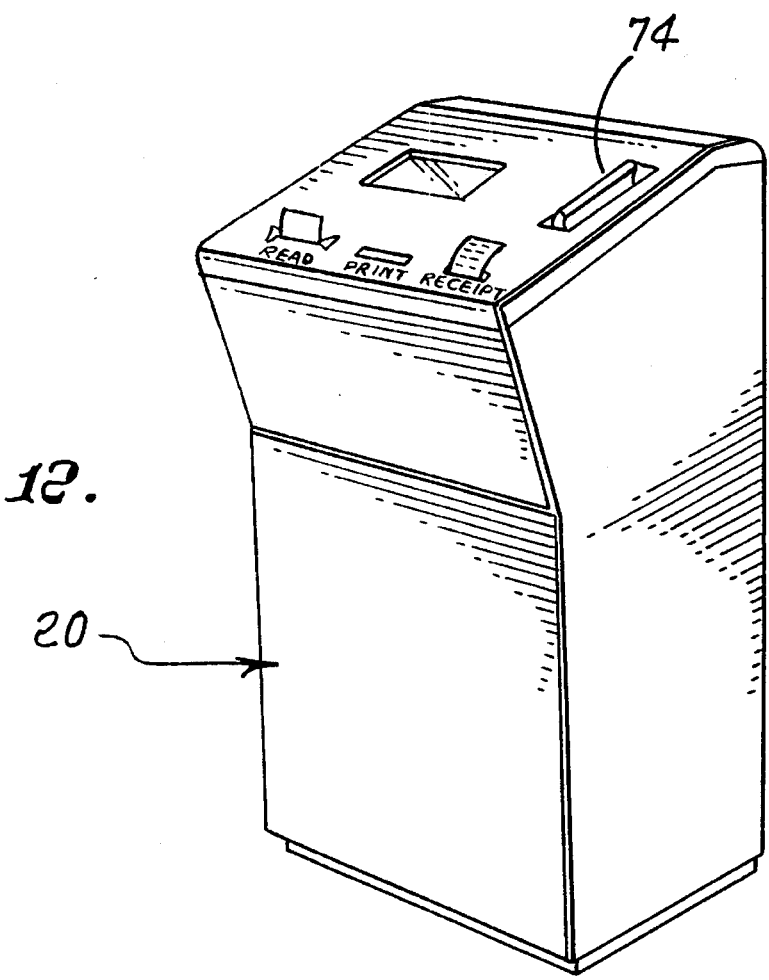
FIG. 12 is a perspective view of a kiosk, at an airport, and incorporating card reading, writing and printing apparatus.
Figure 13:
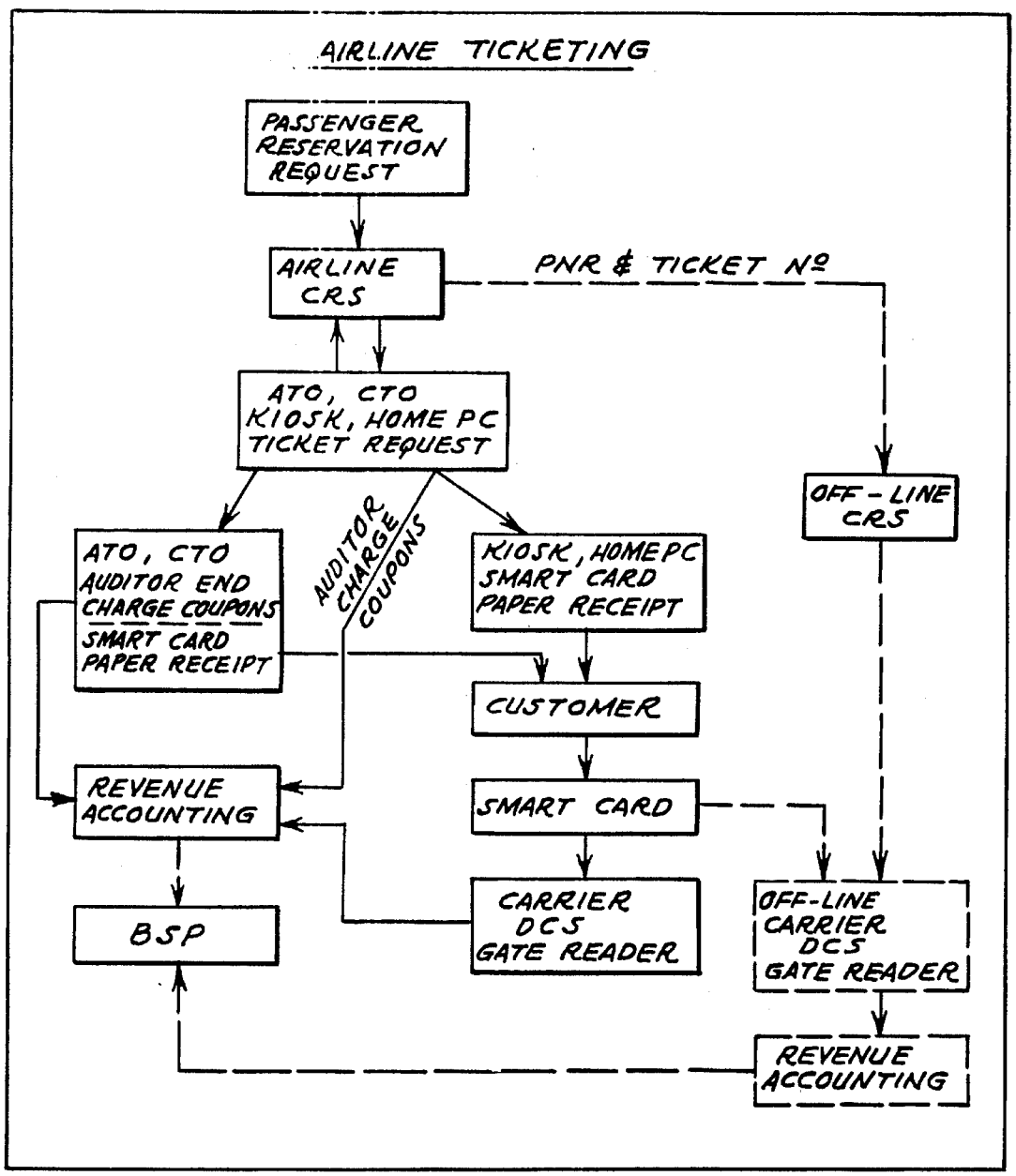
FIG. 13 is an airline ticketing flow diagram, showing steps in automatic ticketing, using the travel card package of the invention.

FIG. 12 shows a kiosk 20 at an airport, to incorporate the apparatus described in FIGS. 10 and 11, or at 14, to produce a usable card package, as described. A boarding pass may be simultaneously printed and delivered to the user, at 74. FIG. 13 is a ticketing flow diagram, with functions labeled, as shown.

When analyzing memory allocation in a smart card it is important to understand that any portion of memory can be protected, for reading and for writing data. This provides a great deal of security, since no unauthorized entity can read or write to the card's memory or print on the card. A PIN number can be provided to protect the passenger against fraudulent use of the card.

A memory allocation using an 8 k byte memory smart card can be employed, with each flight segment carrying all data currently needed and encoded on the ATBs (airline ticket) mag-stripe. Therefore it is in reality transparent to the current system. Only the format code says that it is a card with travel data encoded. When writing the "ticket" from the airline host reservation system or a CRS, the mag-stripe data is written to memory and the printed data is stripped off. Selected print data writes the itinerary.

The layout of this memory allocation can provide an interline T-2 card, with all IATA and ATA requirements. If one only took care of on-line travel, then the allocation would include no revenue data—just flight segment data.

In the examples shown, chip memory cards are used. An RF card can be used. One supplier of RF cards is RACOM, Englewood, Colo.

The "chip" card used is in two different types. The most common is a card with contacts exposed. A supplier of this type is GemPlus in France. AT&T supplies a chip card without contacts.

FIG. 13 shows a typical airline ticketing step-by-step operation using the card package of the invention.

I claim:

1. In the method of providing a ticketless travel card package, the steps that include
   a) providing a generally rectangular base card having opposite first and second sides to carry and present identification indicia at said first side,
   b) providing a programmable read/write memory circuit on a local section of the card to store encoded travel data A,
   c) providing a thermally printable flat sheet laminated onto the second side of the card, said flat sheet defining a zone dedicated to carry and visually present data B which is a sub-set of data A,
   d) storing said data A in said read/write memory circuit,
   e) and thermally printing said data B on said flat sheet and in the form of thermally erasable alpha numeric indicia visually indicative of a travel itinerary.

2. The method of claim 1 including subsequently thermally erasing said data B from said flat sheet.

3. The method of claim 1 including also providing a magnetic strip on said one side of the card, and magnetically storing data C on said strip.

4. The method of claim 1 including providing said flat sheet to have a polyester film base, an overcoat layer, and a thermally recording layer sandwiched between said base and said overcoat layer, said printing of said data B being effected to locate said data B below said overcoat layer.

5. The method of claim 1 including providing:
   i) first means to receive the card and to encode data A in said memory circuit, and erase data B on the flat sheet,
   ii) and second means to receive the card and to thermally print data B on said flat sheet, and inserting said card into said first means which receives the card and includes data in said memory circuit, and which erases previously thermally printed data B on the flat sheet, and inserting said card into said second means which receives the card and which thermally prints updated data B on said flat sheet.

6. The method of claim 3 including also providing a signature strip on said flat sheet.

7. In the method of providing a ticketless travel card package, the steps that include
   a) providing a generally rectangular base card having opposite first and second sides to carry and present identification indicia at said first side,
   b) providing a programmable read/write memory circuit on a local section of the card proximate said first side to store encoded travel data A,
   c) providing a thermally printable flat sheet laminated onto the second side of the card, at a substantial spacing from said circuit whereby the card projects between the entirety of the circuit and said flat sheet, said flat sheet defining a zone dedicated to carry and visually present data B which is a sub-set of data A,
   d) storing said data A in said read/write memory circuit,
   e) and thermally printing said data B on said flat sheet and in the form of thermally erasable alpha numeric indicia visually indicative of a travel itinerary,
   f) and providing said sheet to have a transparent polyester film base, an overcoat layer, and a thermally recording layer sandwiched between said base and said overcoat layer, said printing of said data B being effected to locate said data B below said overcoat layer and spaced from said circuit by said base and by a portion of said card, said thermally recording layer consisting of organic low molecular weight particulate embedded in resin.

* * * * *